(12) United States Patent
Martez

(10) Patent No.: US 7,909,975 B2
(45) Date of Patent: Mar. 22, 2011

(54) SYSTEM FOR RECOVERING GAS PRODUCED DURING ELECTRODIALYSIS

(75) Inventor: Vitselle (Vita) S. P. Martez, Calgary (CA)

(73) Assignee: Volker Stevin Contracting Ltd., Calgary (CA)

( * ) Notice: Subject to any disclaimer, the term of this patent is extended or adjusted under 35 U.S.C. 154(b) by 1159 days.

(21) Appl. No.: 11/539,541

(22) Filed: Oct. 6, 2006

(65) Prior Publication Data

US 2007/0084728 A1    Apr. 19, 2007

(30) Foreign Application Priority Data

Oct. 6, 2005 (CA) .................................. 2522424

(51) Int. Cl.
B01D 61/44 (2006.01)

(52) U.S. Cl. ........ 204/630; 204/633; 204/634; 204/635; 204/636; 204/637; 204/638; 204/278; 204/258; 204/266

(58) Field of Classification Search .................. 204/630, 204/633–638, 56, 258, 266, 270, 278
See application file for complete search history.

(56) References Cited

U.S. PATENT DOCUMENTS

| | | | |
|---|---|---|---|
| 2,794,777 A | 6/1957 | Pearson | |
| 3,963,567 A | 6/1976 | Cole | |
| 5,843,292 A * | 12/1998 | Spiros | ............................ 204/258 |
| 6,569,298 B2 | 5/2003 | Merida-Donis | |
| 6,652,719 B1 * | 11/2003 | Tseng | ............................ 204/257 |
| 6,824,662 B2 | 11/2004 | Liang et al. | |
| 2003/0132097 A1 | 7/2003 | Kenet et al. | |
| 2004/0219400 A1 | 11/2004 | Al-Hallaj et al. | |
| 2005/0103630 A1 | 5/2005 | Ganzi et al. | |
| 2005/0103724 A1 | 5/2005 | Wilkins et al. | |
| 2005/0150768 A1 | 7/2005 | Sferrazza | |
| 2006/0060532 A1 | 3/2006 | Davis | |
| 2006/0144787 A1 | 7/2006 | Schmidt et al. | |

FOREIGN PATENT DOCUMENTS

JP    9057258    3/1997

OTHER PUBLICATIONS

Lazar, R. "Using the fuel cell technology to produce electricity from hydrogen electrolyzing seawater and as a by-product desalinized water", Electrical and Electronics Engineers in Israel (IEEE); Dec. 1, 2002, pp. 44-46.

* cited by examiner

Primary Examiner — Arun S Phasge
(74) Attorney, Agent, or Firm — Sean W Goodwin

(57) ABSTRACT

Disclosed is a system for recovering gas produced during electrodialysis of a saline solution, from gas entrained in an electrolyte solution circulating through anode and cathode compartments of an electrodialysis (ED) unit. In one embodiment, the system provides separate catholyte and anolyte towers within a closed, re-circulating loop between the cathode and anode compartments. Each tower comprises an inlet at which the entrained gas separates from the electrolyte solution and flows into the headspace. One can recover residual gases from the electrolyte solution in one more additional apparatus. Preferably, hydrogen gas is separated from the catholyte solution and, more preferably, further purified for use as a fuel source in alternative power generating devices, such as a fuel cell or bio-fuel generator, useful in the unit operations of a water treatment system.

15 Claims, 11 Drawing Sheets

SYSTEM FOR RECOVERING GAS PRODUCED DURING ELECTRODIALYSIS

FIELD OF THE INVENTION

The invention generally relates to water treatment systems and in particular to the recovery of hydrogen gas produced during desalination by electrodialysis, with the hydrogen gas being useful as a fuel source within the unit operations of the water treatment system.

BACKGROUND OF THE INVENTION

As fresh water demands increase along with the confounding impacts of global warming on water, the potential for a global water crisis is imminent because of the decrease in fresh water quality, availability, and supply for human consumption and other commercial, industrial, agricultural sectors. Therefore, integrated water resource management, including water treatment, has become one of the most urgent issues of the $21^{st}$ century.

Depending upon the natural or anthropogenic sources, saline water may generally contain dissolved metals, organic contaminants and a complex mixture of salts, ranging in a total dissolved solids (TDS) concentration from about 1000 mg/L to 250,000 mg/L. Typical sources of saline water are sea water, naturally occurring saline surface water or brackish ground water, fertilizer salt run-off (from irrigation), salt retention ponds (from the storage of de-icer salts for transportation network maintenance), produced water (from oil and gas exploration and production, depressurizing coal bed methane or mine operations and drainage) and brines generated from various industrial processes.

Saline water can be treated by various desalination processes, such as thermal, prissier or electrically driven, to remove dissolved salts and minerals and produce de-mineralized water for various uses, such as for the production of drinking water, effluent treatment and water reclamation. However, conventional desalination processes are energy intensive and can cause significant operational and environmental impact.

Therefore, there is a need in the art for an improved desalination system and a water treatment process.

SUMMARY OF THE INVENTION

Embodiments of the present invention comprise a water treatment process in which hydrogen gas, as a byproduct of water desalination by electrodialysis, is captured. Further, the hydrogen can be used as a source of energy for an advanced alternative power generating device, such as a fuel cell or bio-fuel generator, to contribute to the water treatment process to thereby reduce energy consumption of the overall water treatment process.

More particularly, gas produced during electrodialysis (ED) of saline water is recovered from a two phase gas/liquid electrolyte solution that flows through an electrode compartment of a conventional ED unit. Specifically, hydrogen gas is entrained in a catholyte solution circulating through a cathode compartment, while oxygen gas is entrained in an anolyte solution circulating through an anode compartment. The catholyte and anolyte solutions are each fed to separate catholyte and anolyte tanks or towers (electrolyte towers), respectively, in which the entrained gas separates from the solution in a headspace of the towers and is collected at a gas outlet within the headspace, at ambient temperature and pressure.

Notably, bench-scale experiments have found that attempts to recover the gas directly from the electrode compartments results in extreme pH imbalances within the ED unit and deterioration of the ED unit's ion exchange membranes, while the use of the electrolyte towers obviates that problem. Preferably, the alkaline catholyte solution and the acidic anolyte solution circulating from the towers are mixed in an electrolyte mixing tank to neutralize the pH before returning the electrolyte solution to the ED unit.

As opposed to some prior art systems which require the use of relatively inert gas, such as nitrogen gas, to dilute or sweep the hydrogen from electrolyte solution and some others which simply vent hydrogen gas to the atmosphere, the present system captures a relatively pure hydrogen gas stream. Further, as the hydrogen gas is spatially separated from the oxygen gas when it is recovered, cross-contamination of the usable gas is reduced while also minimizing the risk of explosion. The hydrogen gas can be further processed to increase hydrogen gas purity as required for the intended advanced power generating device.

Embodiments of the invention reduce the impact of the desalination process on the environment and act to recover a useful fuel source.

While it is particularly contemplated that the invention recovers hydrogen and oxygen gas, other gases that may be produced during a particular operation of an ED unit can also be recovered.

Accordingly, in a broad aspect of the invention there is provided a system for recovering gas produced during electrodialysis comprising an electrodialysis unit comprising at least one electrode compartment for circulating an electrolyte solution therethrough, with the gas being entrained in the electrolyte solution, and at least one electrolyte tower fluidly connected to the at least one electrode compartment. The at least one electrolyte tower comprises an upper headspace portion and a gas outlet positioned in the upper headspace portion. The electrolyte solution is to be circulated between the at least one electrode compartment and the at least one electrolyte tower and wherein the entrained gas is to be recovered into the head space portion and collected from the gas outlet.

In one embodiment, an electrolyte solution inlet is positioned within the headspace portion to enhance efficient separation of the gas from the electrolyte solution.

The recovered gas can be further processed to increase the gas purity, such as by a gas scrubber coupled with a coiled tube bubbler. Devices for purifying the gas can be positioned within the tower or external to the tower.

In another broad aspect of the invention, there is provided an energy efficient water treatment system comprising a hydrogen powered device for providing at least a portion of power to operate the unit operations of the water treatment system, and an electrodialysis unit for treating a salt-containing feedwater to produce a desalinated water stream and a concentrated brine stream. The electrodialysis unit comprises a cathode compartment for circulating a catholyte solution therethrough, with a hydrogen gas being entrained in the catholyte solution. The system further comprises a catholyte tower fluidly connected to the cathode compartment, the catholyte tower comprising an upper head space portion and a hydrogen gas outlet positioned within the headspace portion. The catholyte solution is to be circulated between the cathode compartment and the catholyte tower and wherein the entrained gas is to be recovered into the head space portion of the catholyte tower and collected from the gas outlet for use in the hydrogen powered device.

Other embodiments of the invention are described herein.

BRIEF DESCRIPTION OF THE DRAWINGS

In drawings which are intended to illustrate embodiments of the invention and which are not intended to limit the scope of the invention.

DETAILED DESCRIPTION OF THE INVENTION

It is to be understood by one of ordinary skill in the art that the following is a description of exemplary embodiments only and is not intended as limiting the broader aspects of the invention.

Figure 1:
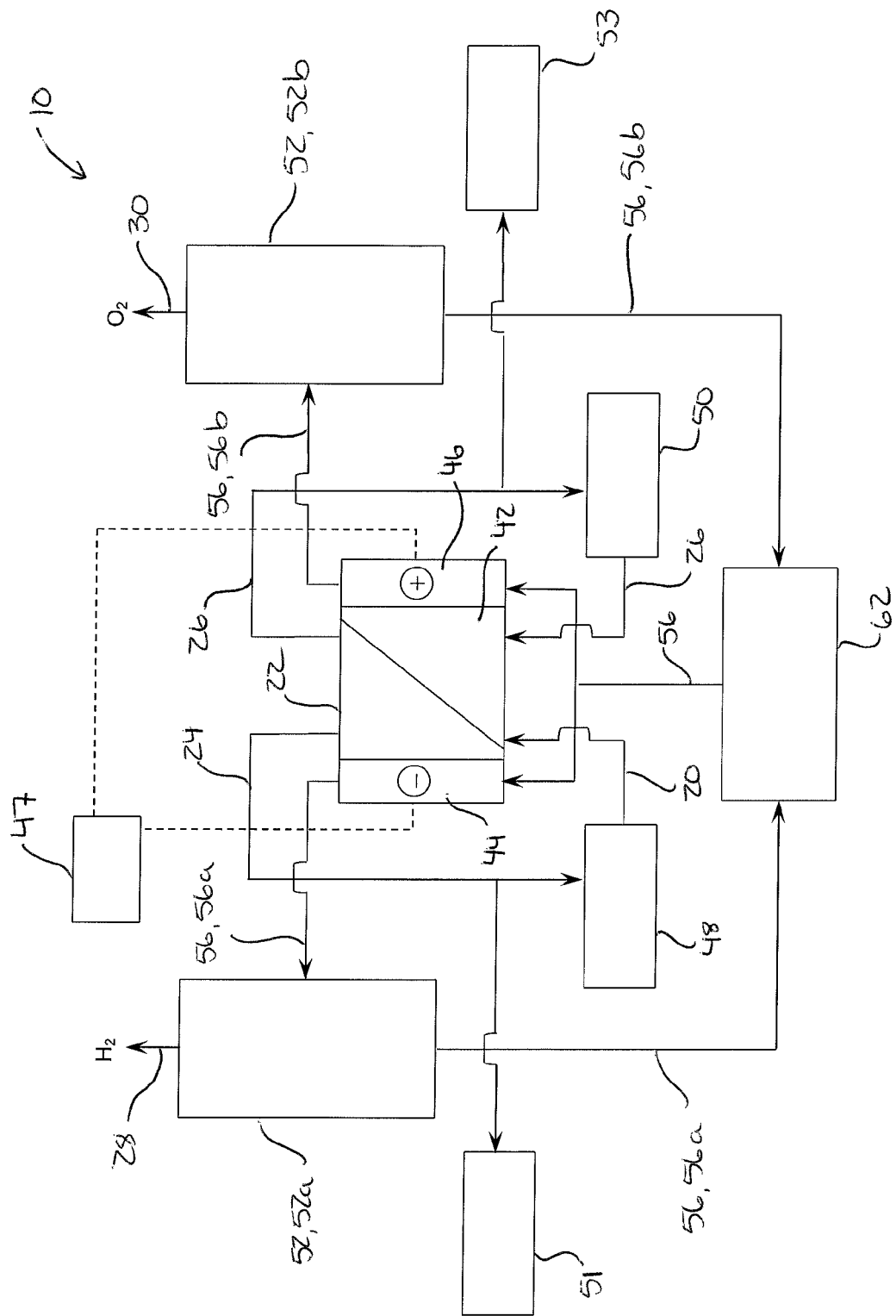
FIG. 1 is a flow diagram of a system for recovering gas produced by electrodialysis according to an embodiment of the present invention.

With reference to FIG. 1, a system 10 for recovering gas produced during electrodialysis is generally shown in which salt-containing feed water 20 is fed through an electrodialysis (ED) cell 22 to produce an low TDS or desalinated water stream 24 and a concentrated TDS brine stream 26, while recovering separate streams of hydrogen gas 28 and oxygen gas 30.

Figure 2:
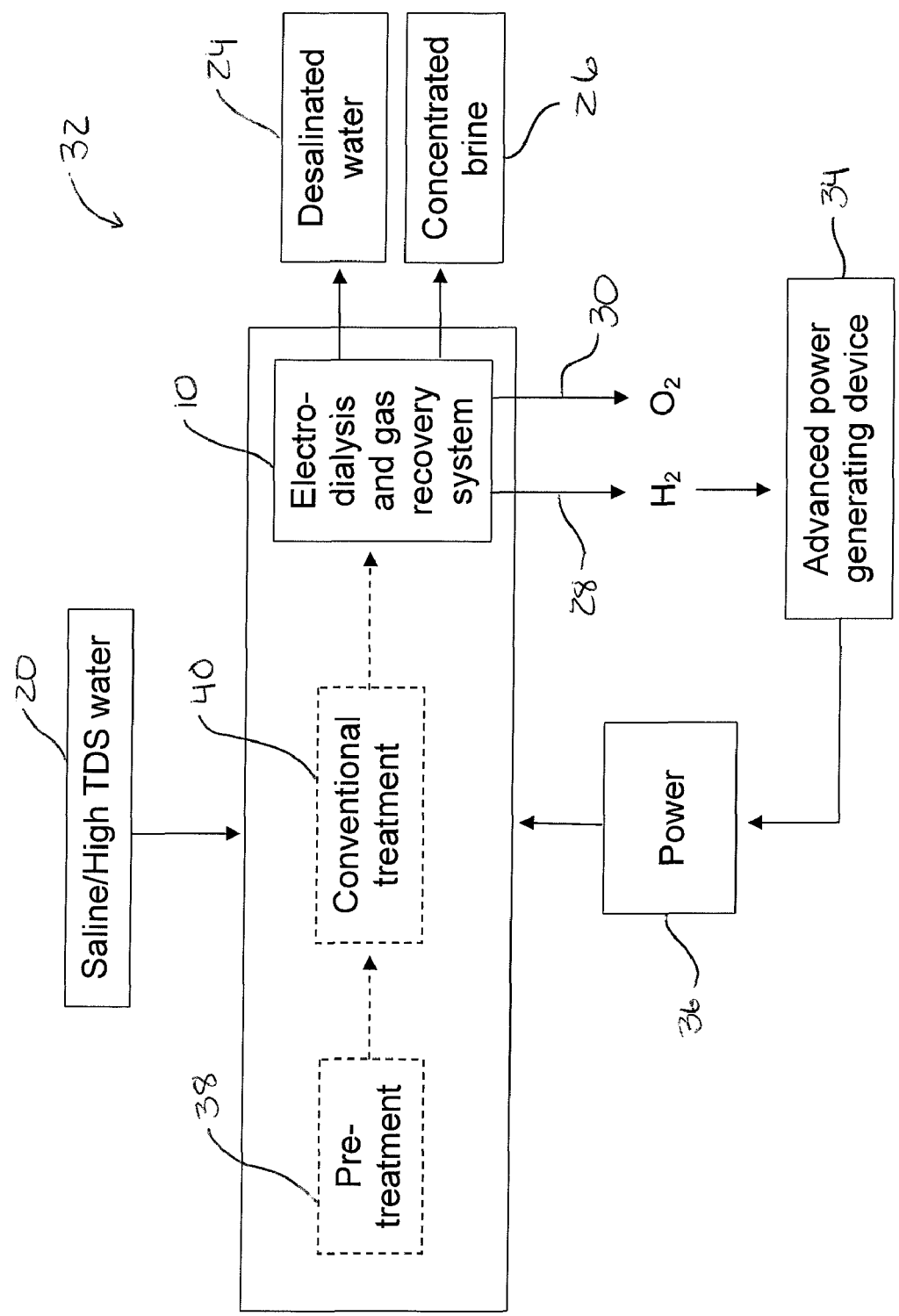
FIG. 2 is flow diagram of a flow diagram of a water treatment process using the system of FIG. 1, with recovered hydrogen gas being used as a fuel source for an advanced power generating device used in the system.

With reference to FIG. 2, the system is particularly useful as part of an energy efficient water treatment system 32 in which the recovered gas, in particular hydrogen gas 28, is used as a fuel source for a power generating device 34 (e.g. solid oxide fuel cells (SOFC), bio fuel, gas or alternative energy powered generators, hydrogen proton exchange membrane (PEM) fuel cells) that provides power 36 to the unit operations of the water treatment system 32. For example, the power 36 can be used to augment or meet the power requirements of the ED unit 22, water pre-treatment processes 38 (e.g. to remove total suspended solids, hardness ions, metals, organics and other contaminants), or other conventional water treatment processes 40 (e.g. distillation, evaporation, partial vapour pressure processes, ion exchange, pressure driven membrane processes and other electrically driven membrane processes).

In detail and with particular reference to FIG. 1, the ED unit 22 generally includes a membrane compartment 42 positioned between a cathode compartment 44 and an anode compartment 46, as is generally known in the art. The membrane compartment 42 contains a stack of alternating anion exchange membranes and cation exchange membranes (not detailed), and the cathode and anode compartments 44, 46 contain a cathode and anode, respectively (not shown).

In the known and usual operation of the ED unit 22, the feed water 20 passes through the membrane compartment 42 while an electrical field is imposed under the influence of an external direct current power source 47 connected to the anodes and cathodes. Selective cation and anion movement across the membranes produces the desalinated water stream 24 and the concentrated brine stream 26, which then exit the ED unit 22. The desalinated water stream 24 is circulated through the membrane compartment 42 and a feed water recycle tank 48. The brine concentrate stream 26 is circulated through the membrane compartment 42 and a brine recycle tank 50.

The feed water 20 can be subjected to additional cycles of electrodialysis until an acceptable concentration of TDS has been achieved to produce a final product water 52, as determined by a conductivity sensor or other means. Similarly, the brine concentrate 26 achieves the desired TDS to produce a final brine concentrate 53 which can be reused, such as pre-wetting transportation roadways in winter maintenance operations.

Any suitable ED unit 22 can be used as would be contemplated by one skilled in the art. It is particularly contemplated to use the HEED® ED unit (EET Corporation, Harriman, Tenn. and as described in U.S. Pat. No. 6,824,662 which is herein incorporated by reference) as the desalinated water 24 recovery is high (about 85%) and the waste brine 26 recovery is low (about 15%), operated in either batch or semi-continuous mode.

The system 10 further comprises electrolyte towers 52, and specifically a catholyte tower 52a and an anolyte tower 52b, that provide for the separate recovery of the produced gases as recovered gases G, namely hydrogen gas 28 and the oxygen gas 30, respectively, produced during operation of the ED unit 22. In particular, the produced gas is entrained in an electrolyte solution 56, e.g. aqueous sodium sulphate, which circulates between the electrode compartments 44, 46 and the electrolyte towers 52a, 52b. More specifically, the hydrogen gas 28 is entrained in a catholyte solution 56a that is fed from the cathode compartment 44 to the catholyte tower 52a, and the oxygen gas 30 is entrained in an anolyte solution 56b that is fed from the anode compartment 46 to anolyte tower 52b. Importantly, because the hydrogen gas 28 is separated from the oxygen gas 30 by the respective anolyte and catholyte and anolyte towers 52a, 52b, the risk of explosion of the recovered hydrogen gas 28 is reduced, and the use of an inert gas for venting is eliminated.

Generally, the pH of the catholyte solution becomes alkaline (e.g. pH 10.0 to 12.0) while the pH of the anolyte solution becomes acidic (e.g. pH 2.0 to 4.0). Therefore, the catholyte and anolyte solutions 56a, 56b are mixed in an electrolyte mixing tank 62 including to neutralize the pH before the electrolyte solution 56 is returned to the electrode compartments 44, 46. Alternatively, the catholyte and anolyte solutions 56a, 56b can be circulated independently, with the pH of each being adjusted as necessary.

Figure 3:
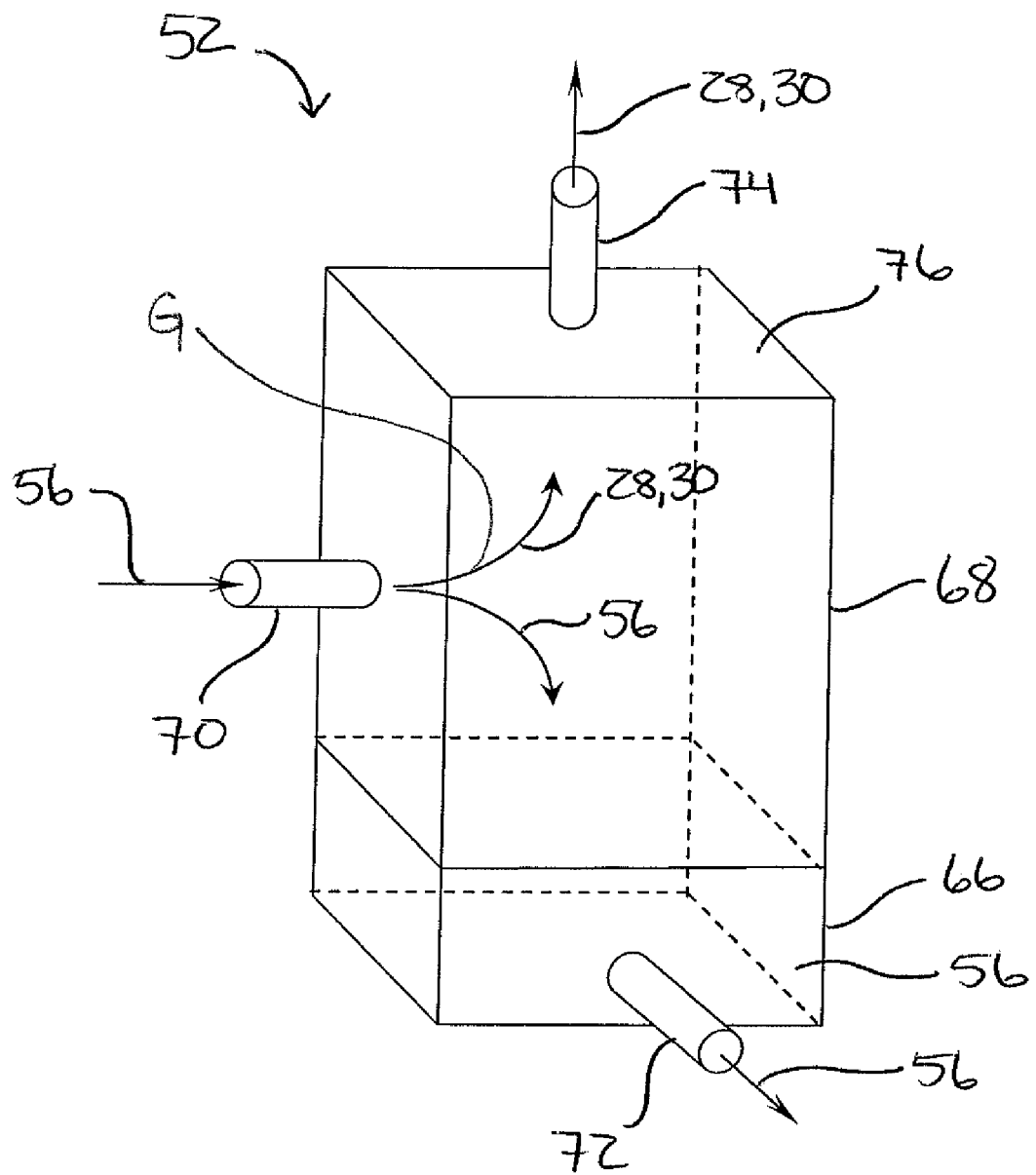
FIG. 3 is perspective view of an embodiment of an electrolyte tower according to FIG. 1

With further reference to FIG. 3, each electrolyte tower 52 is a closed tank having a lower electrolyte solution portion 66 that contains circulating electrolyte solution 56 and an upper head space portion 68. Electrolyte solution 56 flows from the cathode compartments 44,46 and is discharged to their respective towers 52 through an electrolyte solution inlet 70. As the electrolyte solution 56 passes through the inlet 70 and into the headspace portion 68, the entrained hydrogen or oxygen gas 28, 30 separates from the electrolyte solution 56.

Figure 4A:
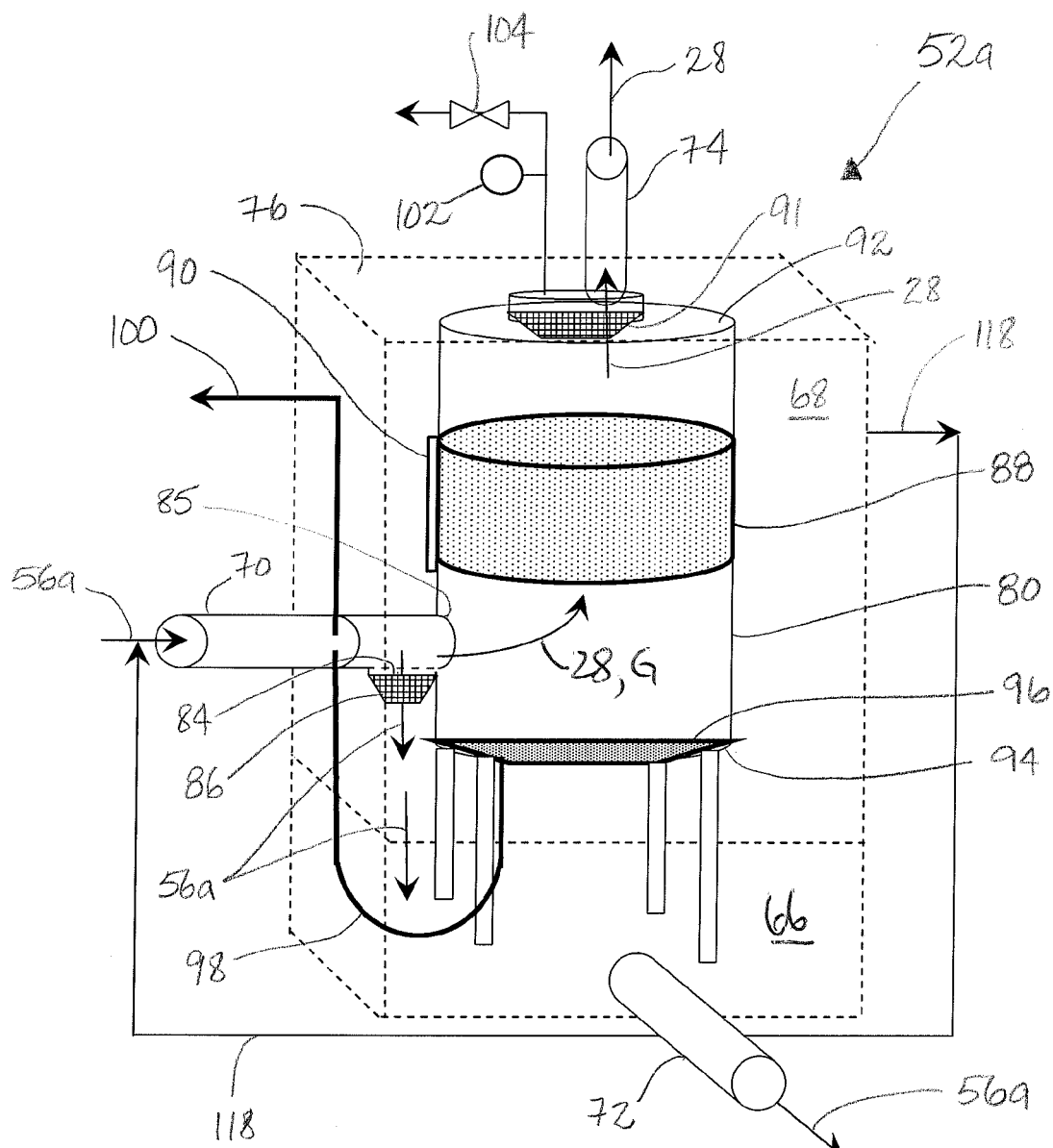
FIG. 4A is a perspective view of another embodiment of a catholyte tower according to FIG. 1, with the catholyte tower including additional components for purifying hydrogen gas.
Figure 4B:
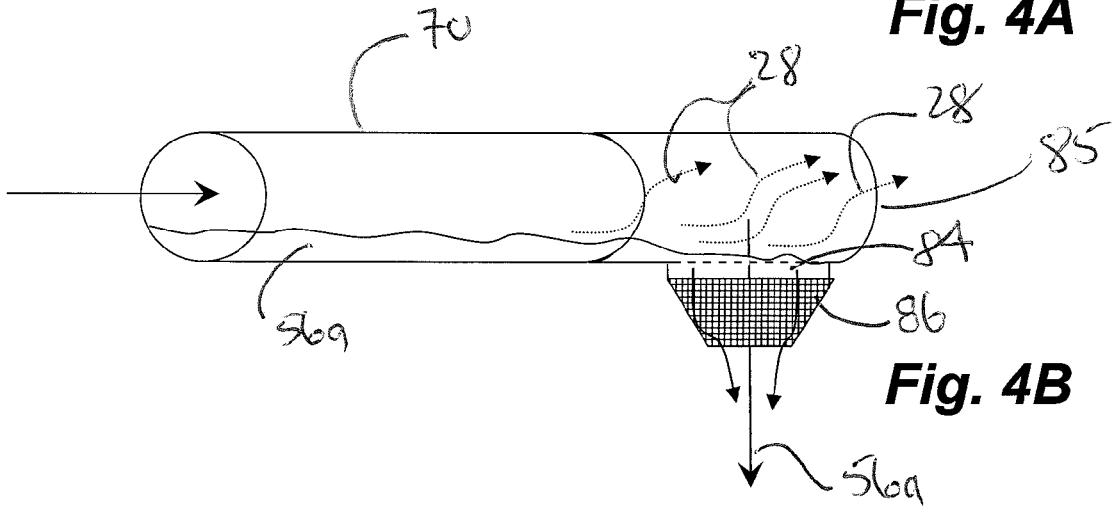
FIG. 4B is a perspective view of the electrolyte solution inlet illustrating electrolyte solution flowing to the drain port and separated gases according to FIG. 4A.

As shown in FIGS. 4A and 4B, the electrolyte solution inlet 70 is a conduit comprising an electrolyte solution drain port 84 and a gas discharge 85. The drain port 84 can comprise a liquid sump or trap including fit with a perforated frit 86, with the drain port 84 being appropriate positioned for discharge of the electrolyte solution 56 for collection such as in the electrolyte solution portion 66. As the electrolyte solution 56 flows out of the drain port 84 and into the electrolyte solution portion 66, the entrained gas separates from the electrolyte solution 56 and the resulting separated gas 28 flows into the headspace 68 without adversely affecting the upstream ED unit membrane dynamics. Preferably the solution inlet 70 and drain port 84 are arranged to retain the electrolyte solution 56 to maximize separation of the recovered gases G from the entrained gases while allowing the electrolyte solution 56 to drain into the electrolyte solution portion 66. In one case, a perforated frit 86 is employed to controlling drainage of the electrolyte solution 56 while enabling recovered gas G to separate from solution.

Preferably the solution inlet 70 is positioned within the headspace portion 68 and an electrolyte solution outlet 72 is positioned within the electrolyte solution portion 66. The entrained hydrogen or oxygen gas 28, 30 flows into the headspace portion 66, while the electrolyte solution 56 flows into the electrolyte solution portion 66 for discharge from the electrolyte solution outlet 72. The hydrogen or oxygen gas 28, 30 in the headspace portion 68 is directed out a gas outlet 74 adjacent a top 76 of the tower 52 for collection and use, as desired. The recovered gas G, 28, 30 can be further processed in serially arranged devices either independently arranged or incorporated in the towers 52 themselves.

The electrolyte towers 52 are of any suitable construction as would be appreciated by one skilled in the art. Preferably, the towers 52 are columnar, constructed of non-corrosive material such as polyethylene terephtalate (PET) copolymer plastic. An exemplary electrolyte tower 52 is a vertically elongated vessel with the electrolyte solution portion 66 making up about the bottom 10-15% of volume. A removable top 76 that can be secured with a detachable metal seal flange permits access to the electrolyte tower 52 as required.

While the electrolyte towers 52 generally serve to provide for gas/liquid separation of gas entrained in an electrolyte solution, the separated gas can be further processed to achieve a desired purity according to various techniques known in the art. For example, the electrolyte towers 52 can also include various additional components for purifying the recovered gas. This is particularly important when recovering hydrogen gas 28 to reduce cross-over contaminants and to increase the purity of the hydrogen gas 28 for use as a fuel source. Particularly, to avoid approaching the hydrogen lower explosive limit (LEL), it is preferably to remove oxygen cross-contamination, Accordingly and with reference again to FIG. 4A, an embodiment of the catholyte tower 52a further includes a chamber 80 positioned above the electrolyte solution portion 66 and within the headspace portion 68. The electrolyte solution inlet 70 is in fluid communication with the chamber 80. Located within the chamber 80 is a gas scrubber 88, positioned above the electrolyte solution inlet 70, which selectively removes cross-contamination as the recovered hydrogen gas 28 flows upwardly through the gas scrubber 88 and out of the gas outlet 74. For example, for removing contaminating oxygen and nitrogen gases from hydrogen gas 28, the gas scrubber 88 can be one or more of a mixed bed carbon molecular sieve and an oxygen scavenging adsorbent such as iron powder. An access door 90 is provided on the chamber 80 to remove and replace the gas scrubber 88 as necessary.

The chamber 80 also includes a liquid trap 91 positioned at the top 92 of the chamber 80 at the gas outlet 74, with the liquid trap 91 being a conical porous strainer. The liquid trap 91 serves to coalesce vapor from the recovered hydrogen gas 28 into large droplets which then drips back into the chamber 80. The droplets may include scrubbing liquor from the adsorbent which are collected at a bottom 94 of the chamber 80. Collected liquid, which may contain trace high density gas contaminants, exits the chamber 80 such as though a porous alumina frit 96 and into a U-tube drain trap 98 and preferably is directed through an outlet 100 out of the catholyte tower 52a.

Alternatively, the chamber 80 and associated gas purification devices could be located external to the catholyte tower 52a, as would be evident to one skilled in the art.

Also at the top end 76 of the catholyte tower 56a one can monitor a lower explosive limit (LEL) 102 and provide an emergency exhaust and pressure relief vent line 104.

Figure 5:
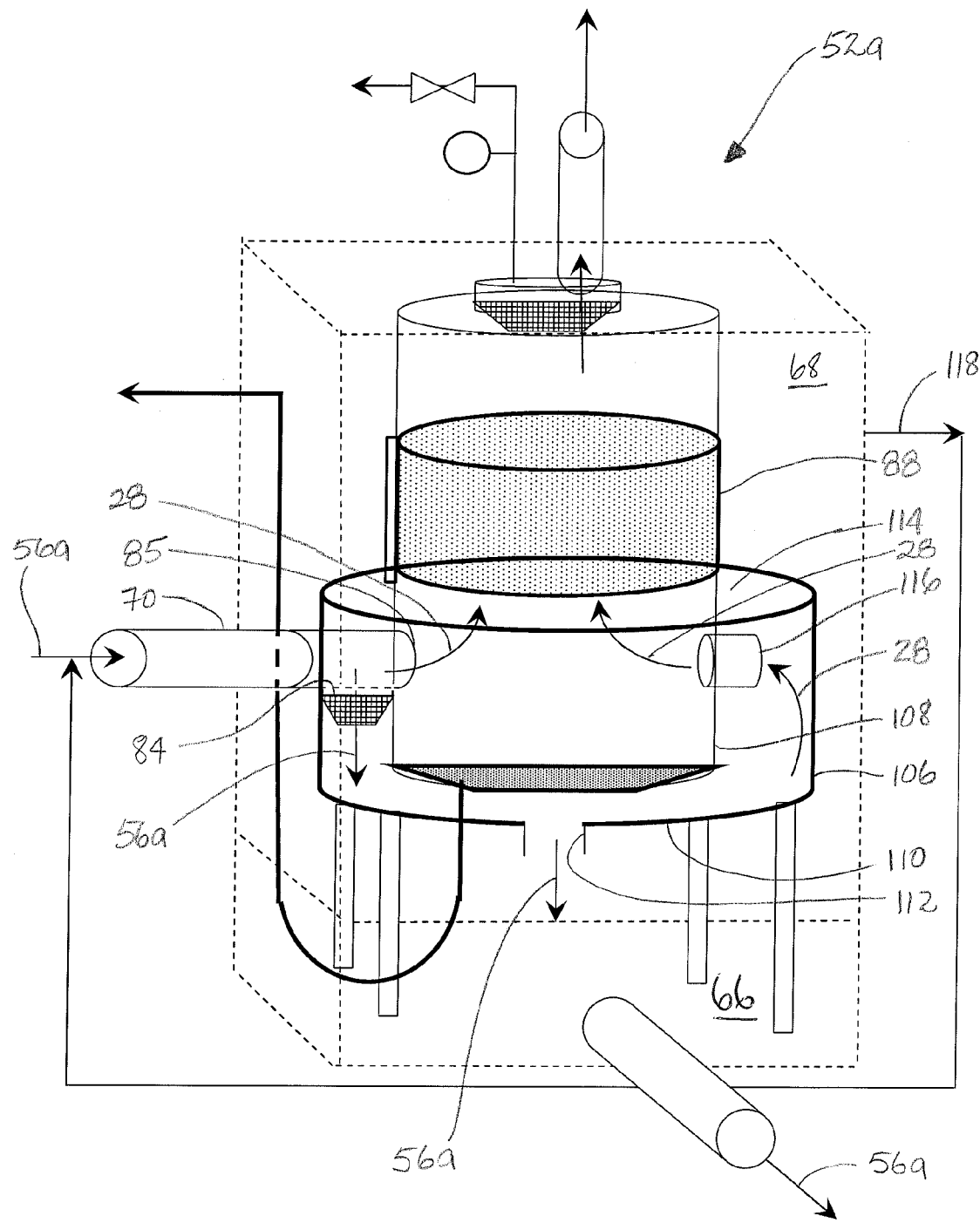
FIG. 5 is a perspective view of yet another embodiment of a catholyte tower according to FIG. 1, with the electrolyte tower including additional components for purifying hydrogen gas and collecting fugitive gases.

With reference to FIG. 5, to aid in further recovery of residual hydrogen gas 28 from the catholyte solution 56a, a partial sleeve 106 is positioned around a lower portion of the chamber 80. An annular space 108 is formed between the chamber 80 and the sleeve 106 in which the electrolyte solution drain port 84 is located. A bottom end 110 of the sleeve 106 receives the catholyte solution 56a and provides additional residence time for recovery of any residual separated gases 28. The bottom end 110 includes a secondary drain port 112 for outflow of spend catholyte solution 56a into the electrolyte solution portion 66. A top end 114 of the sleeve 106 encloses the annular space 108 and a secondary gas inlet 116 to the chamber 80 is positioned below the scrubber 88. Residual gas 28 is collected within the annular space 108 and directed into the chamber 80 through the secondary inlet 116.

Further yet, a conduit 118 is provided between the headspace portion 68 and the electrolyte solution inlet 70 to recycle fugitive gas in the catholyte tower that is outside of chamber 80 and sleeve 106 back to the chamber 80.

Figure 6:
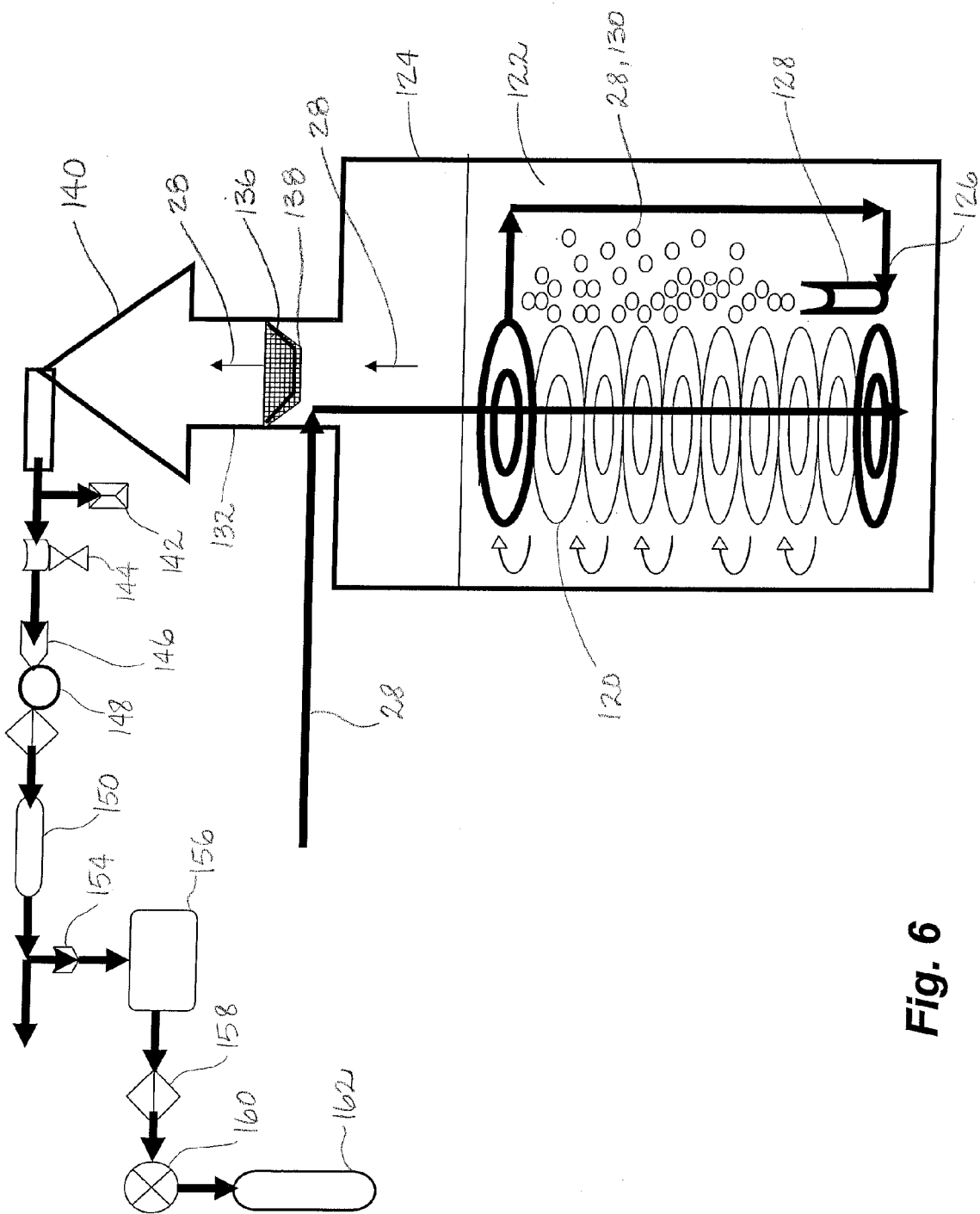
FIG. 6 is a flow diagram of downstream processing steps for further purifying hydrogen recovered according to FIG. 1.
Figure 7:
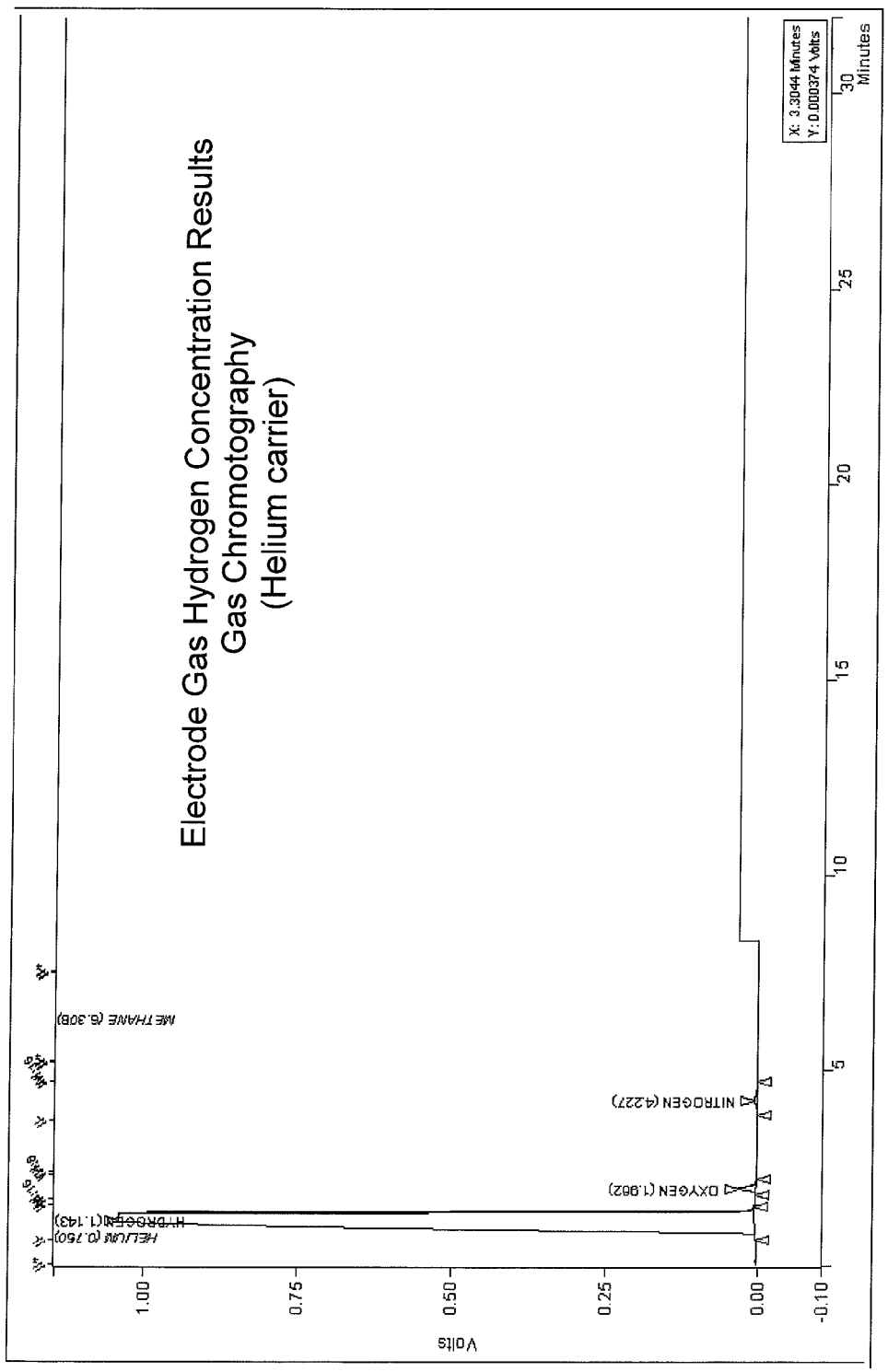
FIG. 7 is a gas chromatogram of the ED process cathode gas (hydrogen concentration results)
Figure 8:
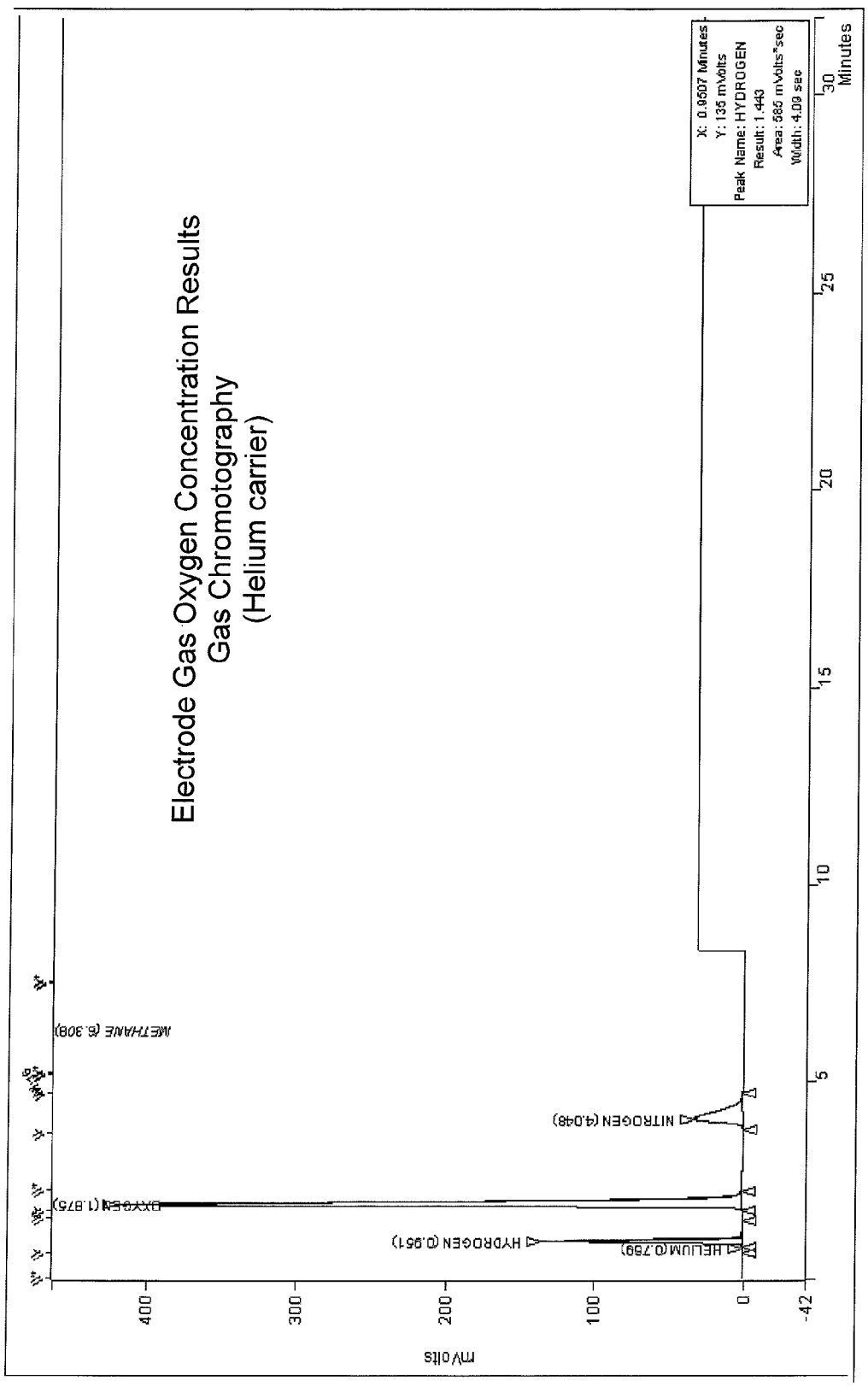
FIG. 8 is a gas chromatogram of the ED process anode gas (oxygen concentration results)
Figure 9:
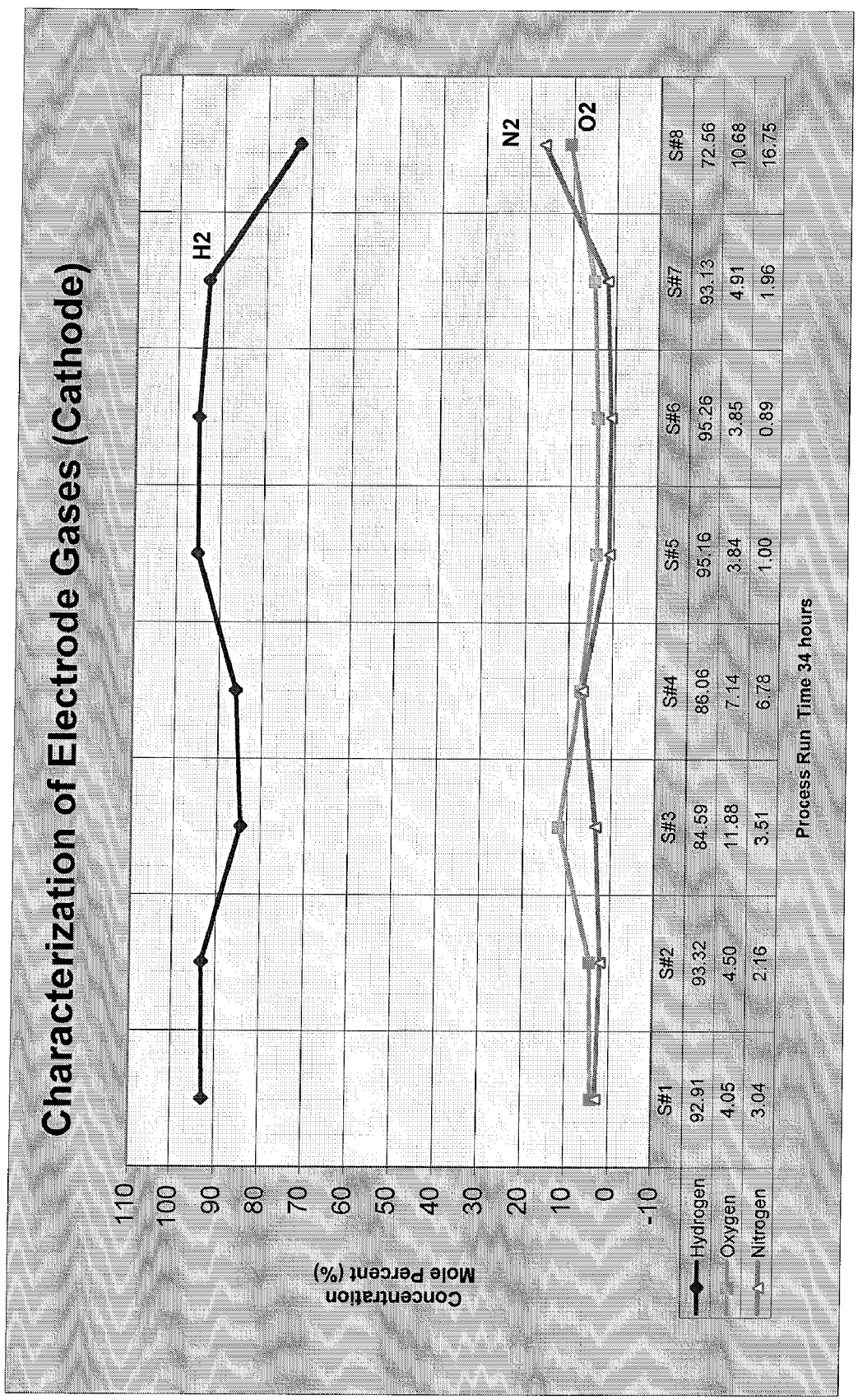
FIG. 9 is a combined table with a graphical representation of the characterization of the hydrogen from the ED electrode gas tower analyzed over a process run of 34 hours, as represented by eight samples.
Figure 10:
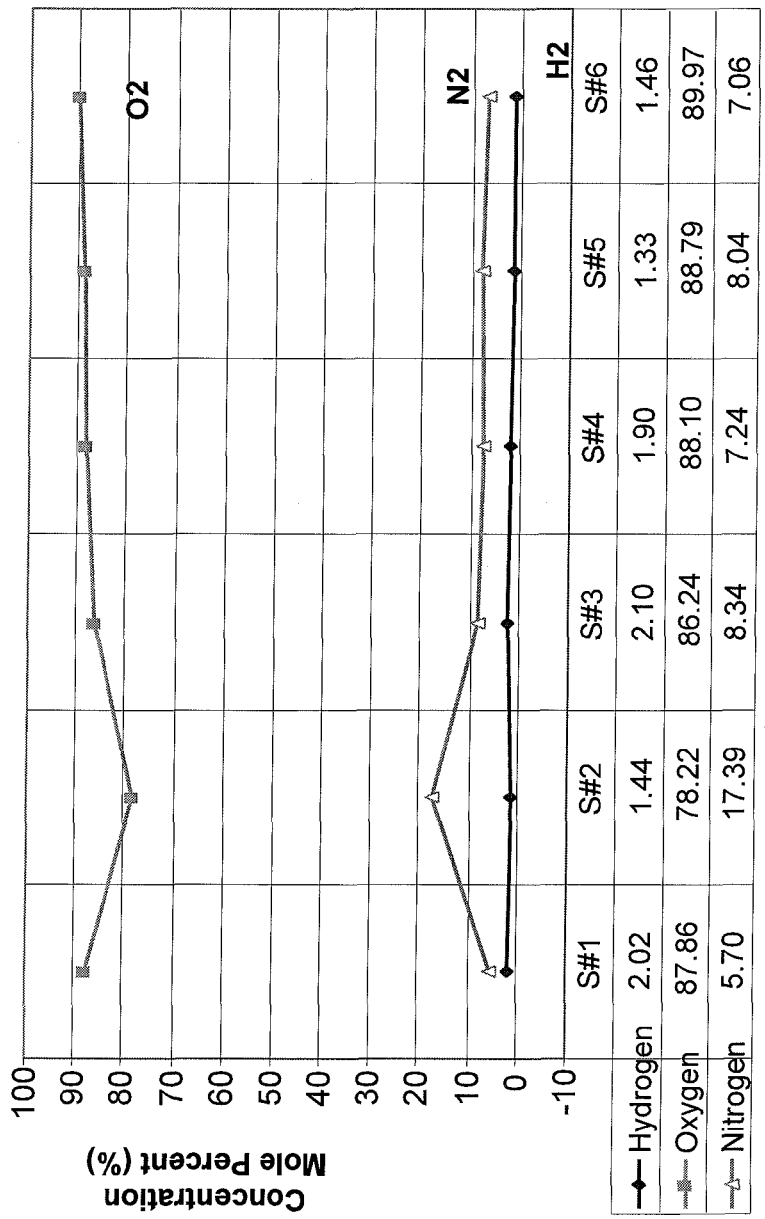
FIG. 10 is a combined table with a graphical representation of the characterization of the oxygen from the ED electrode gas tower analyzed over a process run of 15 hours, as represented by six samples.
Figure 11:
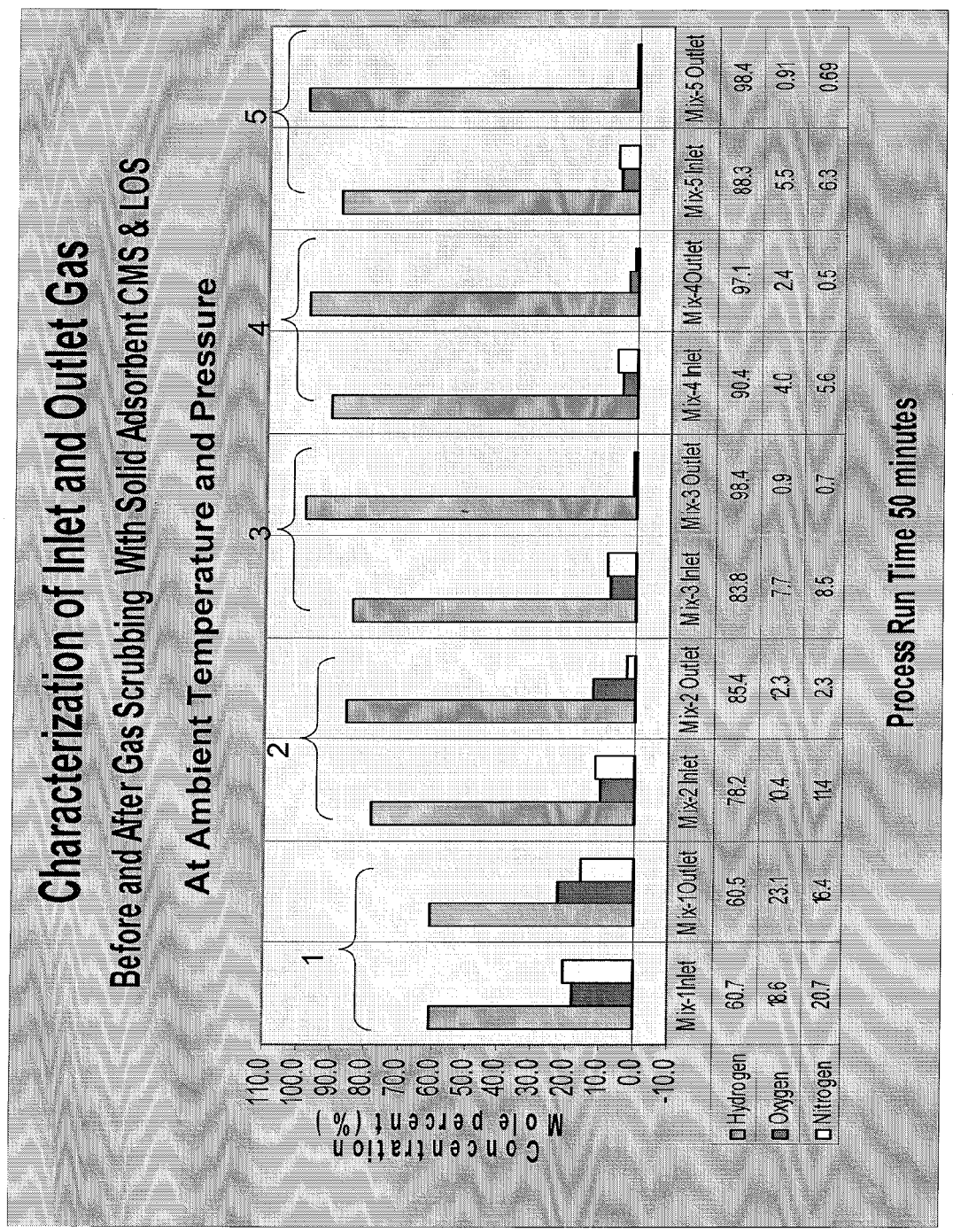
FIG. 11 a combined table with a graphical representation of five simulated sample illustrating the characterization of the inlet and outlet gas before and after scrubbing Hydrogen gas with solid adsorbents at ambient temperature and low (atmospheric) pressure (simulating the gas liquid separation chamber).

With reference to FIG. 6, the recovered hydrogen gas 28 can be subjected to additional downstream processing steps. In particular, the hydrogen gas 28 is directed to a coiled, deionized water tube gas bubbler 120 immersed in degassed, deionized water 122 (approximately pH 6.0) within a closed vessel 124.

One form of suitable bubbler includes a flat plate 2 µm ceramic pore sparger 128 positioned at the outlet 126 of the bubbler 120. A steady stream of hydrogen gas micro bubbles 130 are produced in the deionized water 122. The preferred coiled tubing is Vinylidene polyfluoride (PVDF), polyamide or Polychlorotrifluoroethylene (PCTFE) selected for low hydrogen gas permeation. At a low flow-rate (about 1.0 L/minute) the micro-bubbles (about 1 to 2 mm in diameter) create the interfacial surface area to scrub out the ultra-trace amounts of oxygen gas cross-contamination (specific gravity 1.105 at 21° C. solubility 13.8 mg/L at 25° C.) and nitrogen (specific gravity 0.967 at 21° C. and solubility 8.9 mg/L at 25°

C.) while the lighter hydrogen gas (specific gravity about 0.0696 at 21° C. and approximate solubility 0.0182 vol/vol at 25° C.) achieves limited or no mass transfer efficiency.

A gas outlet 132 at the top of the vessel 124 includes a hydrophobic membrane 136 (e.g. Zeflour™, 2 μm 44 mm hydrophobic Teflon™ membrane (Pall Gelman P5PJ047)) on a conical PTFE support 138. The hydrophobic membrane 136 blocks transport of water to remove humidity from the hydrogen gas 28 while permitting the free flow of gas 28 into a discharge duct and hood 140. Coalesced water then drips off the conical support 138 and back into the vessel 124.

The gas bubbler 120 can be positioned within the catholyte tower 52a or outside the catholyte tower 52a.

For moderately high purity gas applications (>98% purity) downstream from the hood and duct 140 is a sample port and gas discharge 142 followed by a water coalescer 144, a flash back arrestor 146, LEL and gas purity sensor 148, flow meter/controller 150 and a sample and discharge line 152 to a burner/bio fuel powered generator (not shown). These moderately high purity gas applications may include advanced power generating devices such as SOFC fuel cells, bio fuel, gas or alternative energy powered generators.

For extremely high purity gas applications (>99.999% hydrogen) the sample line 152 is shut off and diverted through a separate line flash back arrestor 154 into a cryogenic purification system 156 and gas purity sensor 158. The hydrogen gas 28 is compressed 160 and stored 162 for use (fuel cell). These extremely high purity gas applications may include advanced power generating devices such as the hydrogen PEM fuel cells.

FIGS. 7-11 exemplify the characterization of gases recovered using the system 10 of the invention or simulations thereof.

Although preferred embodiments of the invention have been described in some detail herein above, those skilled in the art will recognize that various substitutions, and modifications of the invention, may be made without departing from the scope of the invention.

The embodiment(s) of the invention in which an exclusive property or privilege is claimed are defined as follows:

1. A system for recovering gas produced during electrodialysis comprising:
    an electrodialysis unit comprising at least one electrode compartment for circulating an electrolyte solution therethrough, the gas being entrained in the electrolyte solution; and
    at least one electrolyte tower fluidly connected to the at least one electrode compartment wherein the electrolyte solution is circulated between the at least one electrode compartment and the at least one electrolyte tower, each electrolyte tower comprising:
        an upper headspace portion; and an electrolyte solution portion having an electrolyte solution outlet;
        a chamber positioned within the upper headspace portion and having a gas outlet; and
        an inlet for receiving the electrolyte solution and entrained gas and connecting the at least one electrode compartment with the chamber, the inlet having a drain port into the electrolyte solution portion and a gas discharge to the chamber,
    wherein entrained gas separates from the electrolyte solution to flow through the gas discharge to the chamber as separated gas while the electrolyte solution flows through the drain port to the electrolyte solution portion, the separated gas flowing through the chamber to the gas outlet as recovered gas.

2. The system of claim 1 wherein the at least one electrode compartment is a cathode compartment and the recovered gas is hydrogen gas.

3. The system of claim 1 wherein the drain port is a sump fit with a performed frit.

4. The system of claim 1 wherein:
    the at least one electrode compartment comprises:
        a cathode compartment; and
        an anode compartment; and
    the at least one electrolyte tower comprises:
        a catholyte tower fluidly connected to the cathode compartment; and
        an anolyte tower fluidly connected to the anode compartment,
    wherein hydrogen gas is to be recovered as the recovered gas in the catholyte tower and oxygen gas is to be recovered as the recovered gas in the anolyte tower.

5. The system of claim 4 further comprising an electrolyte mix tank fluidly connected to each of the catholyte tower, the cathode compartment, the anolyte tower and the anode compartment for receiving and mixing electrolyte solution from the catholyte and anolyte towers and returning the mixed electrolyte solution to the cathode and anode compartments.

6. The system of claim 1 wherein the system is operated at ambient temperature and pressure.

7. The system of claim 1 wherein the chamber further comprises a scrubber for receiving the separated gas and removing contaminants therefrom as the recovered gas passes through the scrubber.

8. The system of claim 7 wherein the scrubber is one or more of a mixed bed carbon molecular sieve and an oxygen scavenging adsorbent.

9. The system of claim 1 wherein the drain port is positioned outside of the chamber and within the electrolyte tower.

10. The system of claim 9 further comprising a sleeve positioned around the chamber to form a closed annular space between the sleeve and the chamber, the electrolyte solution drain port being positioned within the annular space for discharging electrolyte solution to the annular space, the chamber further comprising a secondary gas inlet in fluid communication with the annular space wherein residual gas collected in the annular space is directed through the secondary gas inlet and into the chamber and electrolyte solution is directed through a secondary drain port to the electrolyte solution portion.

11. The system of claim 10 further comprising a fugitive gas recycle between the headspace portion and the electrolyte solution inlet.

12. The system of claim 7 further comprising a coiled tube bubbler for receiving and further purifying the recovered gas.

13. A system for recovering gas produced during electrodialysis comprising:
    an electrodialysis unit having:
        a cathode compartment for circulating a catholyte solution therethrough, the gas being hydrogen gas entrained in the catholyte solution;
        an anode compartment for circulating an anolyte solution therethrough, the gas being oxygen gas entrained in the anolyte solution;
    a catholyte tower fluidly connected to the cathode compartment for receiving the catholyte solution circulated from the cathode compartment;
    an anolyte tower fluidly connected to the anode compartment for receiving the anolyte solution circulated from the anode compartment;
    each of the catholyte tower and anolyte tower comprising:

a lower electrolyte solution portion having an electrolyte solution outlet,
an upper head space portion,
a chamber positioned within the upper headspace portion and having a gas outlet, and
an electrolyte solution inlet fit to the chamber and having a drain port, for permitting the electrolyte solution to flow to the lower electrolyte solution portion, and a gas discharge to the chamber; and
wherein, in the catholyte tower, the catholyte solution flows through the electrolyte solution inlet and drain port to the lower electrolyte solution portion and the entrained hydrogen gas separates to flow through the gas discharge to the chamber for recovery from the gas outlet, and
wherein, in the anolyte tower, the anolyte solution flows through the electrolyte solution inlet and drain port to the lower electrolyte solution portion and the entrained oxygen gas separates to flow through the gas discharge to the chamber for recovery from the gas outlet; and
an electrolyte mix tank fluidly connected to the electrolyte solution outlet of each of the catholyte tower and anolyte tower for receiving and mixing electrolyte solution from the catholyte tower and the anolyte tower and returning the mixed electrolyte solution to the cathode and anode compartments.

14. A system for recovering gas produced during electrodialysis comprising:
an electrodialysis unit comprising at least one electrode compartment for circulating an electrolyte solution therethrough, the gas being entrained in the electrolyte solution; and
at least one electrolyte tower, each electrolyte tower comprising:
an upper headspace portion and an electrolyte solution portion having an electrolyte solution outlet;
a chamber positioned within the upper headspace portion and having a gas outlet;
an inlet for receiving the electrolyte solution and entrained gas and connecting the at least one electrode compartment with the chamber, the inlet having a drain port into the electrolyte solution portion and a gas discharge to the chamber,
a sleeve positioned about the chamber and forming an annular space therebetween, the drain port of the inlet positioned in the annular space and a secondary drain port in fluid communication with the electrolyte solution portion, wherein the electrolyte solution flows through the drain port into the annular space and through the secondary drain port to the electrolyte solution portion and the entrained gas separates from the electrolyte solution to flow through the gas discharge to the chamber as separated gas, at least some residual gas remaining in the electrolyte solution for collection in the annular space, the chamber having at least a secondary gas inlet in fluid communication with the annular space for directing residual gas into the chamber; and
a scrubber positioned within the chamber for receiving the separated and residual gas and removing contaminants therefrom as the separated and residual gas passes through the scrubber,
wherein the electrolyte solution is circulated between the at least one electrode compartment and the at least one electrolyte tower and the separated gas and residual gas flowing through the chamber to the gas outlet is recovered as recovered gas.

15. The system of claim 14 further comprising a fugitive gas recycle between the upper headspace portion and the electrolyte solution inlet.

* * * * *